United States Patent [19]
Schiller

[11] Patent Number: 6,147,689
[45] Date of Patent: Nov. 14, 2000

[54] DISPLAYING 2D PATCHES WITH FOLDOVER

[75] Inventor: Stephen N. Schiller, Hayward, Calif.

[73] Assignee: Adobe Systems, Incorporated, San Jose, Calif.

[21] Appl. No.: 09/056,225

[22] Filed: Apr. 7, 1998

[51] Int. Cl.[7] .................................................. G06T 11/40
[52] U.S. Cl. ............................................ 345/423; 345/421
[58] Field of Search .................................. 345/429, 423, 345/420, 440, 441, 421

[56] References Cited

U.S. PATENT DOCUMENTS 5,333,245  7/1994  Vecchione ............................... 345/429
5,390,292  2/1995  Takamura et al. ....................... 345/420
5,428,718  6/1995  Peterson et al. ........................ 345/423
5,995,109  11/1999 Goel et al. .............................. 345/423

*Primary Examiner*—Mark Zimmerman
*Assistant Examiner*—Huedung X. Cao
*Attorney, Agent, or Firm*—Fish & Richardson PC

[57] ABSTRACT

A method and apparatus for rendering a two dimensional (2D) patch associated with an object to achieve a smooth shading across the object where the 2D patch defines a complex gradient including at least one foldover edge. The method includes subdividing the patch until each subpatch includes no more than one foldover edge, grouping the subpatches into regions divided by a foldover edge, defining a ordering for displaying the regions and rendering the regions in order.

31 Claims, 11 Drawing Sheets

DISPLAYING 2D PATCHES WITH FOLDOVER

The present invention relates generally to methods and systems for shading computer generated images and more particularly to methods and apparatus for complex shading of objects displayed on a raster output device.

BACKGROUND OF THE INVENTION

In many computer systems, it is common to represent and convey information to a user through digital images. These images may take a variety of forms such as alphanumeric characters, graphics and other pictorial representations. The digital images may be conveyed to a user on a raster or continuous tone display device, such as a video monitor, printer and the like. Typically, the digital images are stored in digital form, manipulated and then displayed.

A digital image may be stored as a geometric description of a two or three dimensional scene. The description can be manipulated by the user, then converted to digital raster image data for display. How a two or three dimensional object appears when it is displayed to a user depends on numerous factors including the types of light sources illuminating the object; the object's properties including color, texture and reflectance; and the object's position and orientation with respect to the light sources, the viewer and other surfaces which may reflect light on the object.

It is often desirable to present objects for display in color. In conventional graphical systems, color may be applied to a region by defining a single color for the entire region (a "flat" coloring), or to add realism, a plurality of colors may be employed. A transition between colors across the surface of an object is referred to as a color gradient. In order to display a realistic image, a smooth transition between colors across painted areas is required.

One method for defining a color gradient across a region in a display space includes defining a bi-cubic patch enclosing the region. The bi-cubic patch includes four corners each having an associated color and four curves connecting pairs of the corners to form a closed loop. The four curves define the color gradient across the bi-cubic patch as a function of the four colors associated with the four corners of the bi-cubic patch. The method includes defining a unit square in parameter space [(u,v) space] and a mapping function from the unit square to the bi-cubic patch [(x,y) space] such that the corners of the bi-cubic patch map to the corners of the unit square. The color of every point in the unit square is a bi-cubic interpolation of the four colors associated with the four corners of the bi-cubic patch. The method includes clipping the bi-cubic patch for display of the region. A more detailed description of the shading method described above is found in co-pending application entitled "SMOOTH SHADING OF OBJECTS ON DISPLAY DEVICES" to William Bilodeau, et al., U.S. patent application Ser. No. 08/844,701, filed Apr. 18, 1997, attorney docket number 07844/138001, which is incorporated herein by reference.

A bi-cubic patch may be of the form of a mesh and include a number of patches each with four corners and four curves connecting pairs of the corners. Each curve may be a Bezier curve having control handles which may be manipulated by a user to define the color gradient for the region (or a portion of the region). When manipulating the control handles of the Bezier curves for a given patch, complex shadings may be defined. For example, a shading may include a foldover region. A foldover region is a region of a patch where more than one point in (u, v) space (in the unit square) maps to a single point in the patch in (x, y) space. In FIG. 1, two single patch meshes 100 and 102 in (x,y) space defining a shading for a region are shown.

As is shown, a user may define a complex gradient that includes overlapping Bezier curves $b_1$ and $b_2$ at a given point p in patch mesh 102. For example, the color at point p in single patch mesh 102 may be defined by interpolating between the colors $c_1$ and $c_2$ along path $b_1$. In addition, the color at point p may be defined by interpolating between the colors at $c_2$ and $c_3$ along path $b_2$. Because of the foldover condition, multiple colors could be assigned to a single point within the patch.

SUMMARY OF THE INVENTION

In one aspect, the invention provides a method for rendering a two dimensional (2D) patch associated with an object to achieve a smooth shading across the object. The 2D patch defines a complex gradient including at least one foldover edge. The method includes subdividing the patch until each subpatch includes no more than one foldover edge, grouping the subpatches into regions divided by a foldover edge, defining a ordering for displaying the regions and rendering the regions in order.

Aspects of the invention include numerous features. The step of subdividing the patch may include determining a number of regions in the patch and subdividing the patch if the patch is determined to include more than two regions. The step of determining the number of regions in the patch determines if a foldover edge bisects at least two distinct edges of the patch and if not, then the patch is subdividing further.

A region may be characterized as being bounded on at least one side by a foldover edge and the process of determining the number of regions may include constructing a grid of control points associated with a patch where the grid includes a plurality of cells, computing a sign for each corner of the cells, constructing a corner sign array from the signs computed in the computing sign step, grouping the cells into regions and counting a number of regions.

The step of grouping patches into regions may include grouping patches that are adjacent and face a same direction. The step of determining the direction a patch faces may be made based on the direction each corner of the patch faces. The method may further include determining if a patch or subpatch includes a foldover edge defining two distinct regions and if so then assigning an associated portion of the patch to each of the two distinct regions.

The step of defining a ordering may include creating an ordered list of regions. The list may be stored as a trie in which adjacent regions are stored in a parent-child relationship in the trie. The regions may be rendered in display order by traversing the trie. The step of rendering the regions may include rendering each patch associated with a given region by dividing the patch into polygons, rendering the polygons and displaying the object. The step of rendering may include rendering only those portions of a patch that belong to a particular region. The step of grouping may include processing a left edge and a right edge of the patch. Processing an edge of the patch may include evaluating corner points on the edge to determine if corners associated with the edge of the patch are to be included in a region associated with a patch immediately to the left or immediately below the patch.

In another aspect, the invention provides a method of defining a complex gradient for application to an object to be displayed on an output device and includes creating a mesh defining a gradient across the object, manipulating the mesh to obtain a graphically pleasing shading including foldover edges and rendering the mesh including subdividing the mesh into subpatches including not more than one foldover edge, grouping the subpatches into regions, ordering the regions and displaying the regions according to the display order.

In another aspect, the invention provides a method for rendering a two dimensional (2D) mesh associated with an object to achieve a smooth shading across the object. The 2D mesh may include a plurality of patches defining a complex gradient including at least one foldover edge. The method includes creating a list of patches, sorting the list to achieve a predefined ordering of patches, processing the patches in the list in order including subdividing the patches until each patch or subpatch includes no more than one foldover edge, grouping the patches and subpatches into regions divided by a foldover edge, defining an ordering for displaying the regions and rendering the regions in display order.

In another aspect, the invention provides a computer program, tangibly stored on a computer-readable medium, for rendering a two dimensional (2D) patch associated with an object to achieve a smooth shading across the object where the 2D patch defines a complex gradient including at least one foldover edge. The computer program includes instructions for causing a computer to subdivide the patch until each subpatch includes no more than one foldover edge, group the subpatches into regions divided by a foldover edge, define a ordering for displaying the regions and render the regions in order.

In another aspect the invention provides a computer program, tangibly stored on a computer-readable medium, for rendering a two dimensional (2D) patch associated with an object to achieve a smooth shading across the object where the 2D patch defines a complex gradient including at least one foldover edge. The computer program includes instructions for causing a computer to create a list of patches, sort the list to achieve a predefined ordering of patches, process the patches in the list in order including subdividing the patches until each patch or subpatch includes no more than one foldover edge, group the patches and subpatches into regions divided by a foldover edge, define an ordering for displaying the regions and render the regions in display order.

In another aspect, the invention provides an apparatus for rendering a two dimensional (2D) mesh associated with an object to achieve a smooth shading across the object where the 2D mesh includes a plurality of patches 2D defining a complex gradient including at least one foldover edge. The apparatus includes means for creating a list of patches, means for sorting the list to achieve a predefined ordering of patches, means for processing the patches in the list in order including means for subdividing the patches until each patch or subpatch includes no more than one foldover edge, means for grouping the patches and subpatches into regions divided by a foldover edge, means for defining an ordering for displaying the regions and means for rendering the regions in display order.

The invention has numerous advantages. The present invention allows for complex shadings to be defined in three dimensions and provides an easy and coherent mechanism to process three dimensional data in the display of two dimensional images. These and other advantages may be readily apparent from the detailed description and claims provided below.

DETAILED DESCRIPTION

Figure 1:
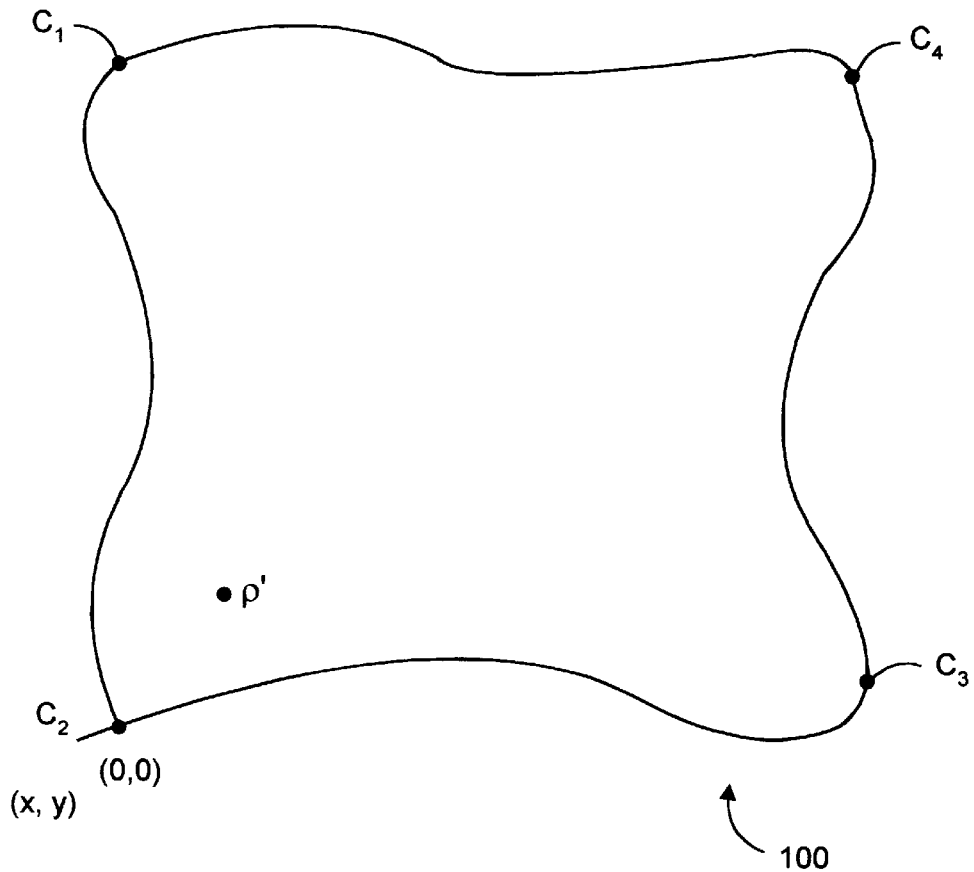
FIG. 1 is a schematic diagram of prior art patch mesh and associated unit square.
Figure 1:
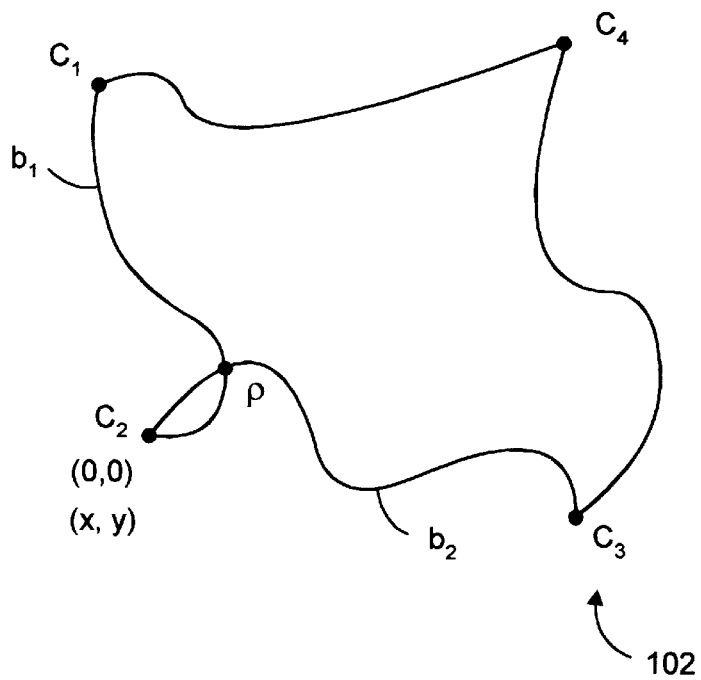
Figure 2A:
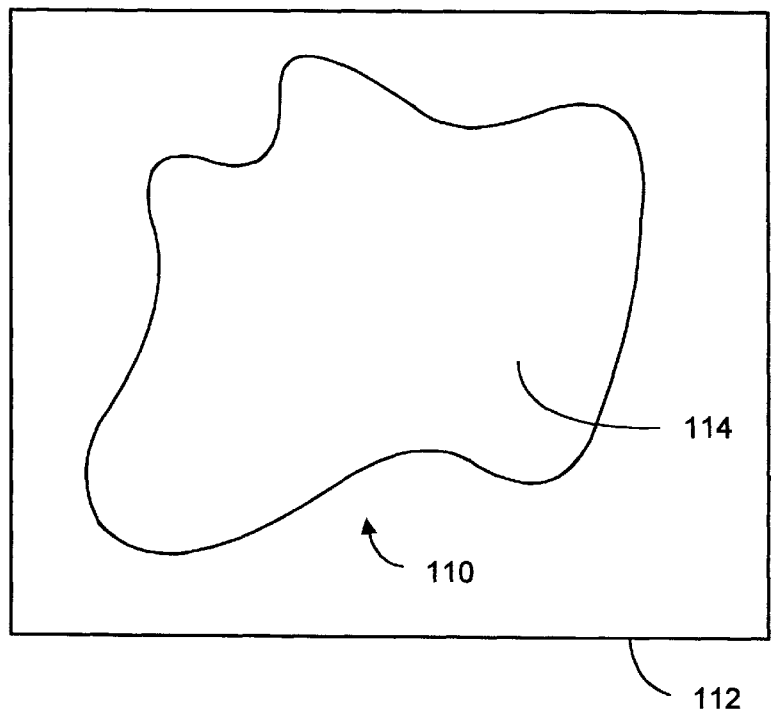
FIG. 2a is a schematic diagram of an object for display in a display space according to the invention.
Figure 2B:
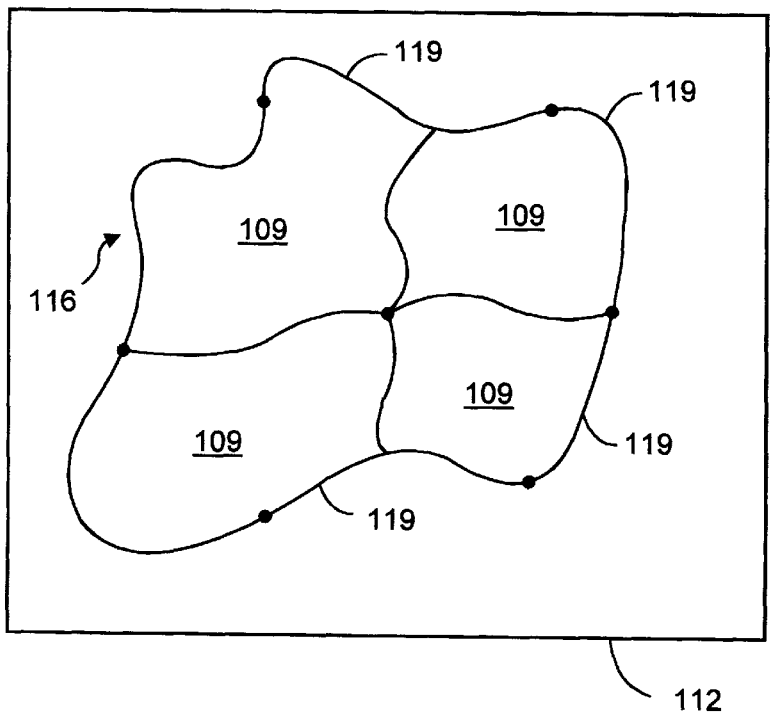
FIG. 2b is a schematic diagram of a patch mesh associated with the object of FIG. 2a according to the invention.

FIGS. 2a and 2b show a two-dimensional object 110 displayed in a display space 112. Object 110 defines a region 114 of arbitrary shape and size. A two-dimensional shading of region 114 is defined by a patch mesh 116 which may be superimposed over object 110 and displayed in display space 112. Patch mesh 116 may be manipulated by a user to adjust a color gradient across region 114.

A patch mesh may be used to describe a non-linear color gradient over a region. Patch mesh 116 is a collection of adjoining patches 119 with shared edges. A patch is a two-dimensional parametric surface. An implicit color function bi-linearly interpolates corner colors across the parametric surface. A gradient is defined by the mapping from interpolated colors on the parametric surface to points within the object. Each patch in the mesh has an associated unit square with equivalent topology. Each unit square has 4 corners with 4 associated colors. Shared edges share corner colors. A patch mesh allows the user to create a complex geometry in the gradient as well as allowing many colors to be interpolated.

Figure 3:
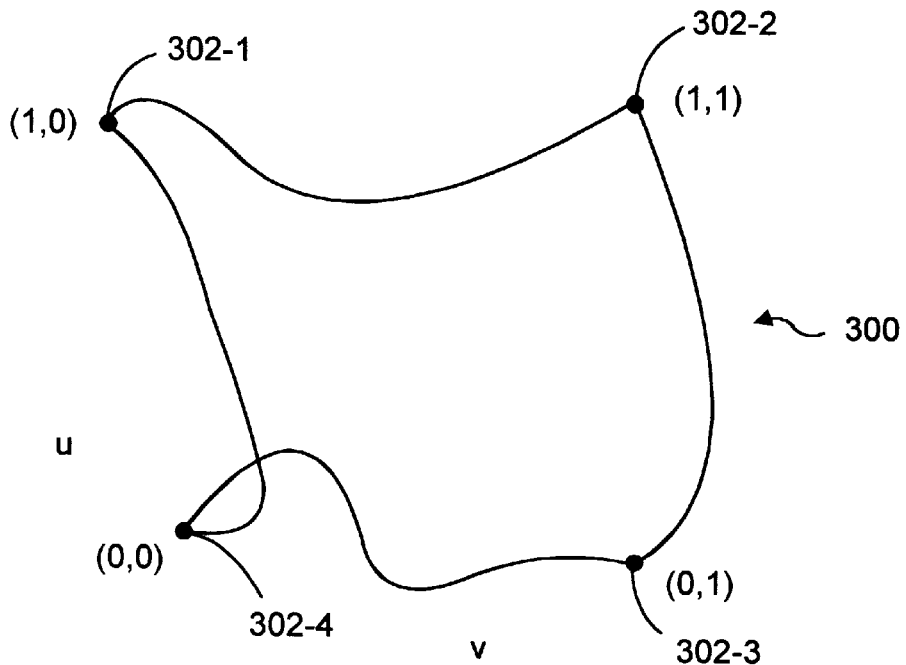
FIG. 3 is a schematic diagram of a patch and associated unit square according to the invention.
Figure 3:
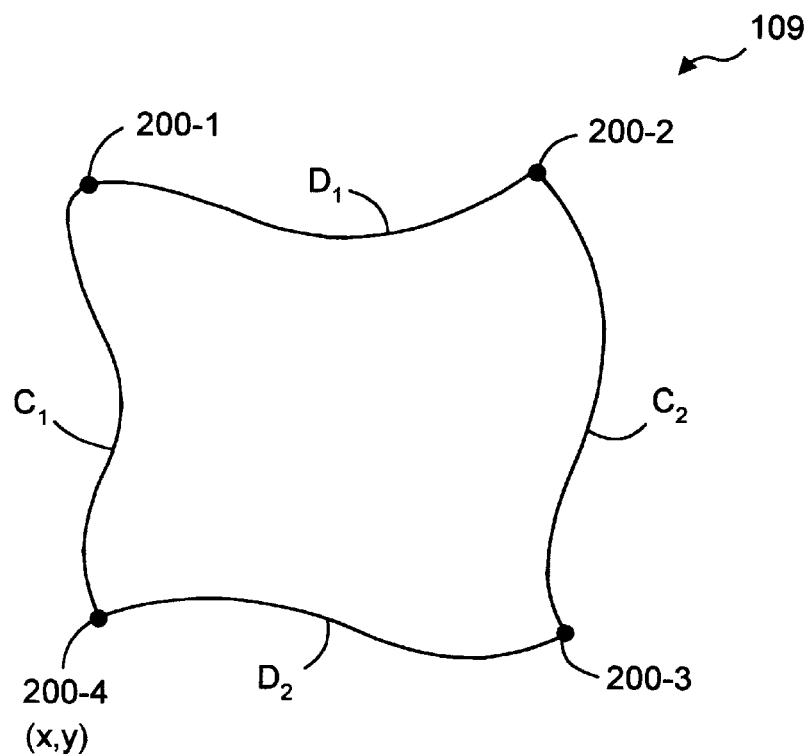

As shown in FIG. 3, each patch 109 may be of the form of a bi-cubic patch. A bi-cubic patch is a parametric surface including four corners 200 bounded by cubic curves (C1, C2, D1, D2). Two types of bi-cubic patches may be used: a Coons patch bounded by cubic Bezier curves (hereinafter a "Coons patch"), and a bi-cubic tensor product surface ("tensor product patch"). The Coons patch can be converted easily to a tensor product surface, so all patches are effectively tensor product surfaces. A tensor product patch is a mapping from a unit square to a patch bounded by four cubic curves, with four additional control points defining the area of the patch within the boundary curves. For the creation of gradients, two-dimensional curves are used.

The mapping may be defined by a pair of parametric functions, one for each dimension. If u and v are the parameters corresponding to the two axes of a unit square, then a function X(u,v) maps points on the unit square to x coordinate values on patch 109. A second function, Y(u, v) maps each point on the unit square (u,v) to y coordinates on the patch 109. Therefore, each point on the patch is defined as (x, y)=(X(u,v), Y(u,v)). Specifically for a bi-cubic Bezier patch, which is a surface defined with cubic Bezier curves, the functions are of the form:

$$S(u,v)=\Sigma^3_{i=0}\Sigma^3_{j=0}P_{ij}B_i(u)B_j(v)$$

where $P_{ij}$ is the control point for row i, column j, of the Bezier control net, and $B_i(u)$ and $B_j(v)$ are the Bernstein polynomials for u and v:

$B_0(t)=(1-t)^3$
$B_1(t)=3t(1-t)^2$
$B_2(t)=3t^2(1-t)$
$B_3(t)=t^3$

To specify a gradient, a user defines colors at the four corners 200 of each patch 109, or equivalently, the four corners of each unit square. The user then manipulates the control points for the parametric surface. As mentioned previously, a mapping is defined for every point on a unit square to a point on the surface (patch). Corner colors are bi-linearly interpolating over the unit square for each path, which then in turn may be mapped to a gradient in the shape of the patch. Other interpolation techniques may be employed as is know in the art. Once the four corner colors have been defined, a user may manipulate patch control points to achieve whatever gradient is desired.

The changes in color within the gradient are affected by manipulation of the control points. For example, a square shape produces a display characterized by a simple bilinear interpolation of the corner colors. If the left and right curves are made to curve inward at the middle, then resultant colors of the gradient will appear to be squeezed in the middle and fan out at the top and bottom. Thus, changes in the curves intuitively define changes in the gradient.

The user may specify curves that cause a foldover condition. A foldover arises when multiple points on the unit square map to one location in the patch. Foldovers can be used to create special effects that resemble three dimensional geometry. With appropriate choice of corner colors, a convincing result can be produced.

Rendering

When the time for display of the region arrives, the graphics processor may advantageously make use of the present invention in order to provide a three-dimensional (3D) coherent appearance to the two-dimensional (2D) graphics display. Rendering of a gradient including one or more patches is a two-step process. The first step includes the subdivision of the gradient into sub-patches, the grouping of patches into regions and the ordering of regions to be rendered. The second step includes dividing the sub-patches in render order into polygons which may then be easily rendered.

In the division of patches, an adaptive subdivision technique is used. Adaptive subdivision works by recursively dividing a patch into smaller and smaller sub-patches until each sub-patch includes at most a single foldover. When all the sub-patches of a mesh patch include one or less foldover regions then the patches may be grouped into regions. Regions are arranged in a render order and thereafter the second step of the rendering process may be invoked.

Figure 4:
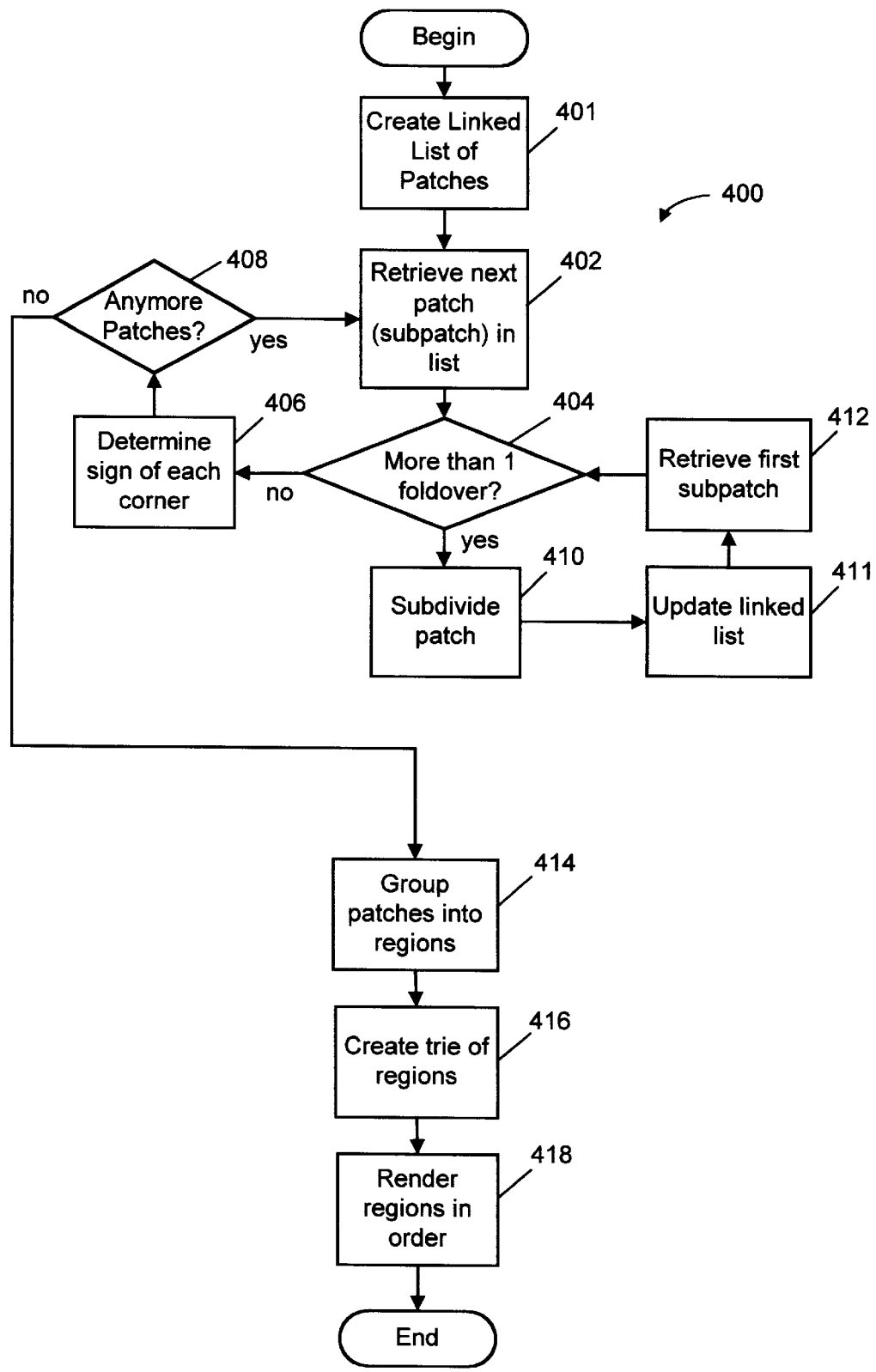
FIG. 4 is a flow diagram of a process for rendering a patch mesh according to the invention.

More specifically, a method 400 for rendering a patch mesh includes creating a linked list of patches (401) and retrieving a first patch in the list (402) as is shown in FIG. 4. The first patch may be any patch in the mesh. In one implementation, the first patch is a patch that includes the bottom left most corner in the patch mesh which corresponds to a (u,v) coordinate of (0,0). Patches are processed in order left to right across the page, with the leftmost patch in any row of patches evaluated first for a given row in the patch mesh. The linked list may be created by taking the patches from the mesh and placing each in a list such that the first patch is the lower left patch. Then patches in the lowest row are added in left to right order to the list. Patches in the next row up are appended to the list in left to right order. Patches from remaining rows are added, each in left to right order, the rows being enumerated from the bottom up. Other ordering schemes may be applied, as long as they provide a coherent mechanism for rendering 3D graphical data in a 2D display environment.

In one implementation, at each subdivision patches are divided uniformly about one or both axes. When a patch is subdivided into two pieces, a left and right half, the two pieces replace the original patch in the linked list with the left half coming first and the right half thereafter. When a patch is subdivided in half, into a top and a bottom patch, the original patch is replaced by the two halves with the bottom half coming first and the top half second in the linked list. If a patch is to be divided into four quarters, this is accomplished by first subdividing into left and right halves, then subdividing the left half into a top and bottom patch, and finally subdividing the right half into a top and bottom patch. At each of these subdivisions the rules for updating the linked list described above are followed.

According to the ordering defined above, when a patch P is processed, the patch below P and the patch to the left of P will have already been processed. Patches are retrieved in order until all of the patches have been processed.

For each patch (or subpatch), a check is made to determine if more than one foldover exists (404). A foldover marks a boundary between regions of a patch. A region is enclosed by one or more boundary edges and foldover edges. A boundary edge exists at each edge of the patch mesh. A foldover edge arises at the transition point between a front facing and rear facing region. Front facing and rear facing regions as well as the process for determining whether more than one foldover exists in a patch is described in greater detail below in reference to FIG. 5*a*.

If zero or one foldover is detected for a given patch, the corners for the patch are processed to determine a sign at each respective corner of the associated patch (406). The sign depends on whether the corner is front facing or back facing. A corner is characterized as front facing or back facing depending on the geometry of the patch. For example, if no foldover edges are present in a patch, then all of the corners face the same direction. If all of the patches in a mesh do not contain foldovers, then all of the corners for all of the patches face the same direction. The terms front facing and back facing have been selected to describe a condition in which a change of region arises between adjacent corners. Adjacent corners that have the same sign are contained in the same region.

The sign for each corner of the patch (sub-patch) is stored along with the patch in memory. In one embodiment, a +1 is stored if the corner is front facing and a −1 is stored if the patch is back facing. A method for determining the sign for a corner of a patch is described in greater detail below in reference to FIG. 5*a*.

If more than one foldover is detected, then the patch (sub-patch) is subdivided (410). The subdivision may be performed along a single axis or may be implemented to achieve a uniform division of a given patch. In one implementation, a patch is divided along a single axis (u or v axis) and then each respective subpatch, starting with a first subpatch (412), in the new group of subpatches produced as a result of the subdivision performed in step 410 is analyzed to determine whether the subpatch includes more than one foldover edge at step 404.

After all the patches have been retrieved and subdivided as required (408), patches and subpatches are grouped into regions (414). A region is defined by a boundary. The boundary for a region may include boundary edges or foldover edges. A patch mesh includes four boundary edges, defining the sides of the patch mesh. In addition, one or more foldover edges may be included within the patch mesh. A patch may include pieces in at most two different regions (based on the subdivision step performed above). Accordingly, the step of grouping patches into regions may require that portions of a patch be assigned to separate regions. In one implementation, this is accomplished by classifying each corner of a respective patch as either front facing or rear facing. Based on the classifications, portions of a patch may be included or designated to belong in a given region.

Regions are characterized as either front facing or back facing. A front facing region is characterized as having been folded over an even number of times whereas a back facing region is characterized as having been folded over an odd number of times. The process for grouping patches into regions is described in greater detail below in reference to FIG. 6.

A list of regions and associated patches is stored in memory (416). In one implementation, the list is stored as a trie which may be traversed during the render process. Regions which are adjacent form parent and sibling relationships in the trie. The base or root node in the trie may be any region. The region including the lower left most patch in the patch mesh which includes a corner corresponding to (u, v) coordinates of (0,0) is used as the base region. Adjacent regions are developed in the trie based on their relationship to the first patch. More specifically, patches are retrieved and rendered based on their position in the trie according to the group to which they belong.

After all of the patches and subpatches have been assigned to a region, the patch mesh may be rendered (418). The rendering begins at the base region, at which time all patches or portions of patches included within the base region are rendered. Regions are rendered based on a predefined order. In one implementation, the order is defined by the trie structure described above. Alternatively, the order may be based on the size of a region, the scan or print direction, or otherwise. All patches associated with a given region are rendered. Thereafter, adjacent regions may be rendered and displayed. The processing of regions continues until all regions associated with the artwork have been rendered (420).

Patch Subdivision

Figure 5A:
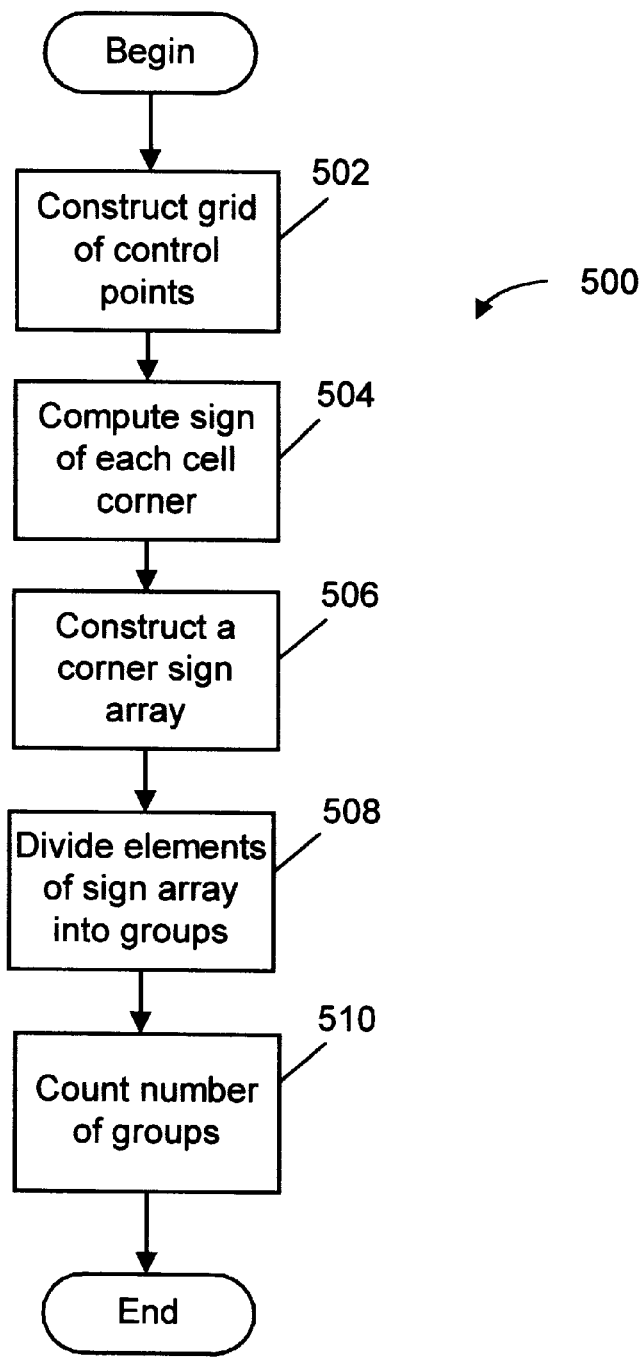
FIG. 5a is a flow diagram of a process for determining if a patch includes more than one foldover region according to the invention.
Figure 5B:
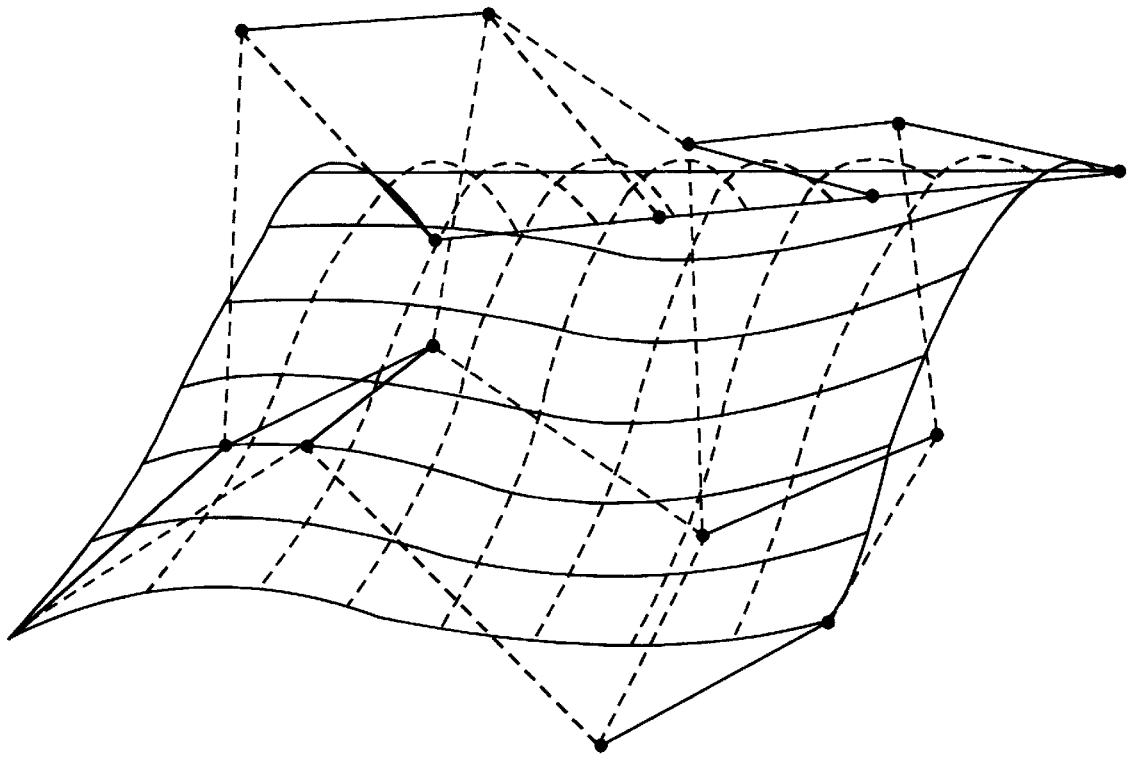
FIG. 5b is a schematic block diagram of a bi-cubic tensor patch according to the invention.

Shown in FIGS. 5a and 5b is a detailed flowchart of process step 404 (FIG. 4) for determining when a given patch needs to be subdivided. In geometric terms, a patch needs to be subdivided if it has more than two folds, or if it has a single fold and that fold starts and ends on the same edge of the patch. In one implementation, the execution of process step 404 includes process steps that result in producing corner information including a sign for each corner of a patch. The sign indicates if the respective corner is front-facing or back-facing. Accordingly, process step 406 described above may be simplified and not require the independent development of the sign information. Alternatively, the corner information may be generated separately or in parallel as required.

As described above, each patch is (or may readily be converted to be) of the form of a bi-cubic tensor patch. The geometry of each bi-cubic tensor patch is controlled by the positions of 16 control points. Each control point has an x and y coordinate. Four of the control points determine the position of the corners of the patch. For each side of the patch, an additional 2 control points control the shape of the curve from one corner to the other. An additional 4 control points control the shape of the interior of the patch.

The 16 control points mathematically determine a mapping from the unit square to the patch. In order to describe the formula for this mapping, an index for the control points is defined including two index variables, i, and j. Thus a control point is denoted P(i,j) where i and j both range independently from 0 to 3. Then if (u,v) is a point in the unit square, this maps to:

Sum of $\{P(i,j)*\text{Binomial}(3,j)*\text{Binomial}(3,j)*(1-u)^{i}*u^{(3-i)}*(1-v)^{j}*v^{(3-j)}\}$ over i=0,3 and j=0,3

Where Binomial(a,b) is the binomial coefficient of a over b.

It turns out that the control points form a mesh that approximates the patch defined above. To be more specific, if a line is drawn between consecutive control points with the same i index in order of increasing j index, and do the same for control points with the same j index in order of increasing i index, then two sets of polygonal lines that intersect to form a grid are produced. The geometry of this grid resembles that of the patch. The grid of control points is used to determine if the corresponding patch has 0, 1, or more folds. This method is not entirely accurate in that it may overestimate the number of folds. However, this will not cause the method to fail and will only result in a small number of extra subdivisions.

For each patch, a grid of control points is constructed (502) including one or more cells. The grid of control points can be viewed as a 3 by 3 array of quadrilaterals where the lines between quadrilaterals are the grid lines. For example, the lower left quadrilateral will have the following control points as corners: P(0,0), P(1,0), P(1,1), P(0,1). In general, the corners of a quadrilateral will have the following control points as corners, for some value of i and j: P(i,j), P(i+1,j), P(i+1,j+1), P(i,j+1). These quadrilaterals are referred to as "cells".

Each cell has four corners. For each cell corner a sign is computed (+1 if front facing or −1 if back facing) depending on whether the cell corner is front facing or back facing (504). Corner signs are computed as follows: for the general cell consisting of P(i,j), P(i+1,j), P(i+1,j+1), P(i,j+1), compute the following vectors:

$V1 = P(i+1,j) - P(i,j)$ $V2 = P(i+1,j+1) - P(i+1,j)$ $V3 = P(i,j+1) = P(i+1,j+1)$ $V4 = P(i,j) - P(i,j+1)$

Next, the corner signs may be computed using cross products as follows:

$s1 = \text{Sign}(V1 \times V4)$ $s2 = \text{Sign}(V2 \times V1)$ $s3 = \text{Sign}(V3 \times V2)$ $s4 = \text{Sign}(V4 \times V3)$ (Where x denotes vector cross product, and the "Sign" function returns −1 if its argument is negative else +1.)

These signs can be arranged in a 2 by 2 array:

s4 s3
s1 s2 corresponding to the positions of the signs in the patch.

In total, there are nine cells, each with 4 corners. This gives 36 corner signs. The 2 by 2 arrays of signs for each of the 9 cells may be assembled into a larger six by six array as follows:

| sS | sR | sW | sV | sΩ | sZ |
|----|----|----|----|----|----|
| sP | sQ | sT | sU | sX | sY |
| sG | sF | sK | sJ | sO | sN |
| sD | sE | sH | sI | sL | sM |
| s4 | s3 | s8 | s7 | sC | sB |
| s1 | s2 | s5 | s6 | s9 | sA |

Here the solid horizontal and vertical lines show boundaries between cells. However for present purposes, the array is treated as an undifferentiated 6 by 6 array and is referred to as the corner sign array (506).

An element of the array at location (n,m) is considered to be "adjacent" to an element at (p,q) if either: p=n and q and m differ by 1, or m=q and n and p differ by 1. In order to determine how many folds are in the patch, the elements of the sign array are divided into groups (508).

To find groups, initially s1 is assigned to its own group. Thereafter, a scan is performed across the bottom row from s2 to sA. For each such element, if the element to the left has the same sign, the element is added to the group of the element to the left. If not, a new group is started and the element is put in the new group.

After the first row has been completed, a scan is performed across the row from s4 to sB in the left to right direction. Again, for each array element E, if the element to the left of E, L, has the same sign, the element E is added to the group of the element L. If the element below E, B, has the same sign also, and the group that B belongs to is different from that of L, then groups B and L are merged. If E has a different sign than both B and L, then a new group of E is started.

All remaining rows are processed in exactly the same way, starting with the third row and going up until completion. After all rows have been scanned, a count is made to determine the total number of groups (510). If the count is equal to three or more, the patch is deemed to have two or more folds and will require subdivision. If the count returns a value of two (indicating that two regions are present), then a check is performed to determine if the single fold (that divides the regions) starts and ends on a different edge. This check is performed to locate regions that may not include a patch corner point.

To determine whether a fold starts and ends on the same edge, a check is made whether at least one of the corner signs of the entire patch is different from the others. The corner signs of the patch are given by s1 and sA, sZ, and sS in counter clockwise order starting at the lower left of the sign array.

Grouping Patches

Figure 6:
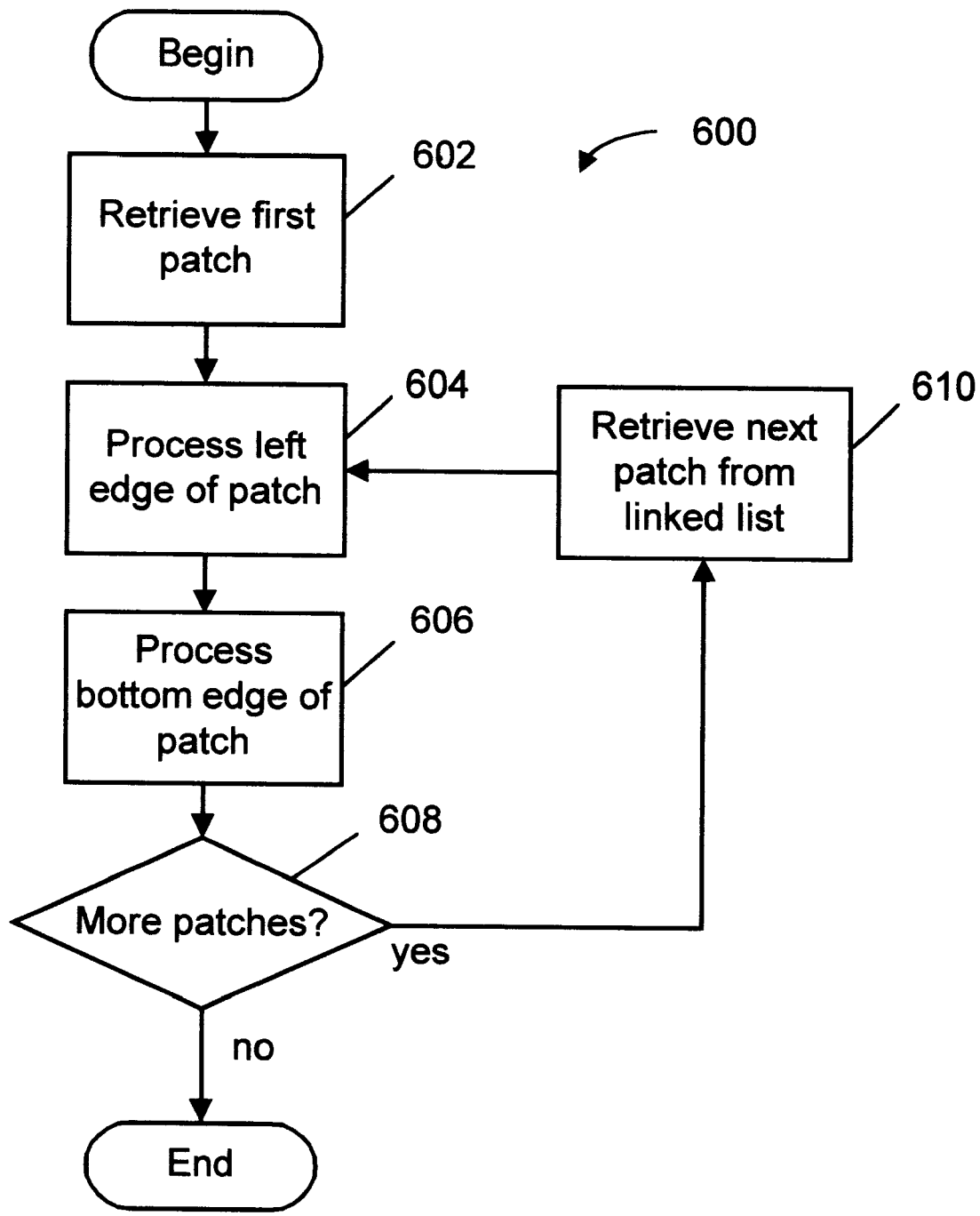
FIG. 6 is a flow diagram of a process for grouping patches according to the invention.

As shown in FIG. 6, patches may be grouped according to a process 600. A pseudocode description for the processes associated with the grouping of patches is included as Appendix A attached to this specification.

The patches are assumed to be in a linked list as described above. A first patch in the linked list is retrieved (602). The left edge of the patch is processed to determine the grouping for the left bottom corner and left top corner of the patch (604). Thereafter, the bottom edge of the patch is processed to determine the grouping for the right bottom corner and right top corner of the patch (606). A check is made to determine if more patches remain to be processed (608). If more patches are to be processed, then the next patch in the linked list is retrieved (612). If no more patches are to be processed, then the process ends (610).

Figure 7A:
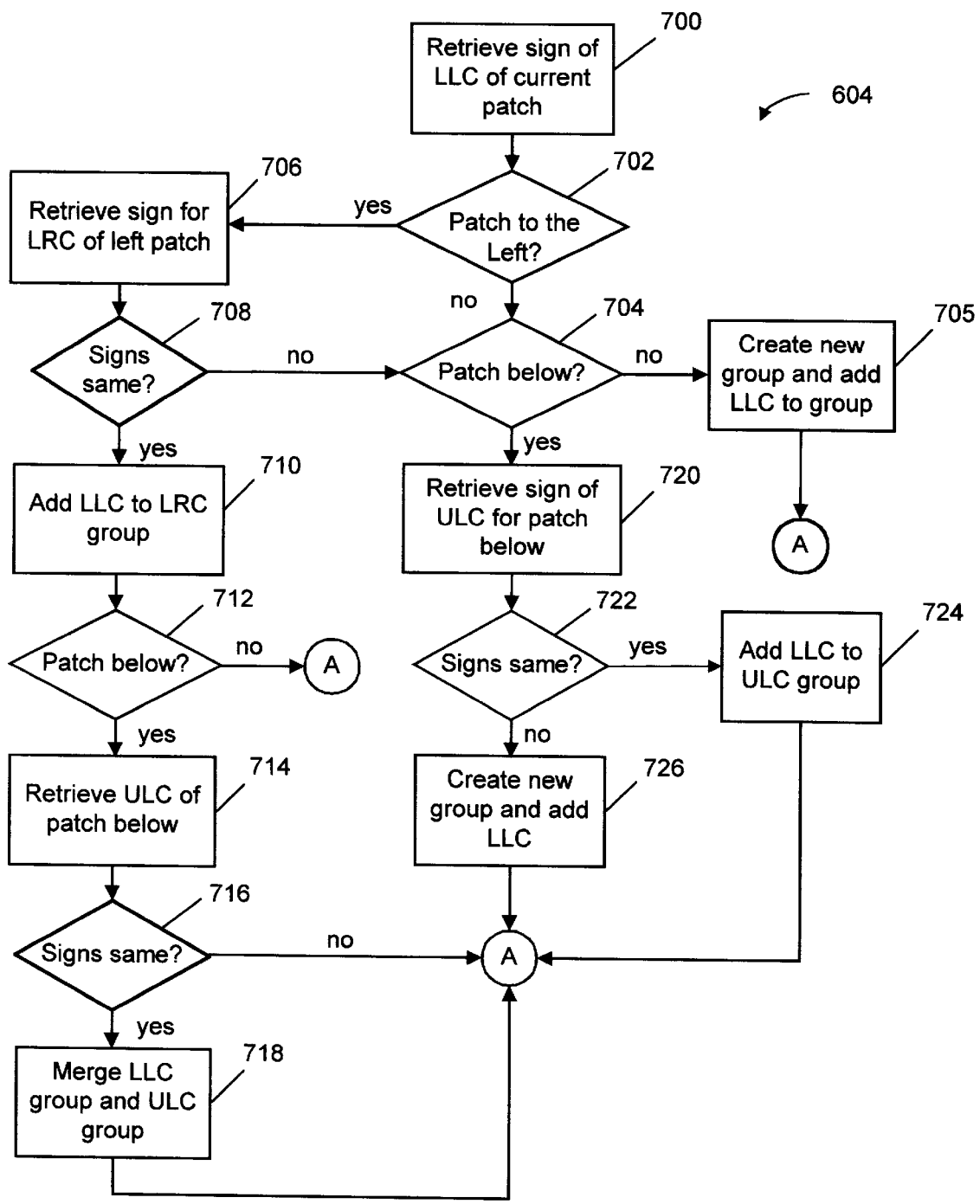
FIGS. 7a and 7b are a flow diagram of a process for processing a left edge of a patch according to the invention.
Figure 7B:
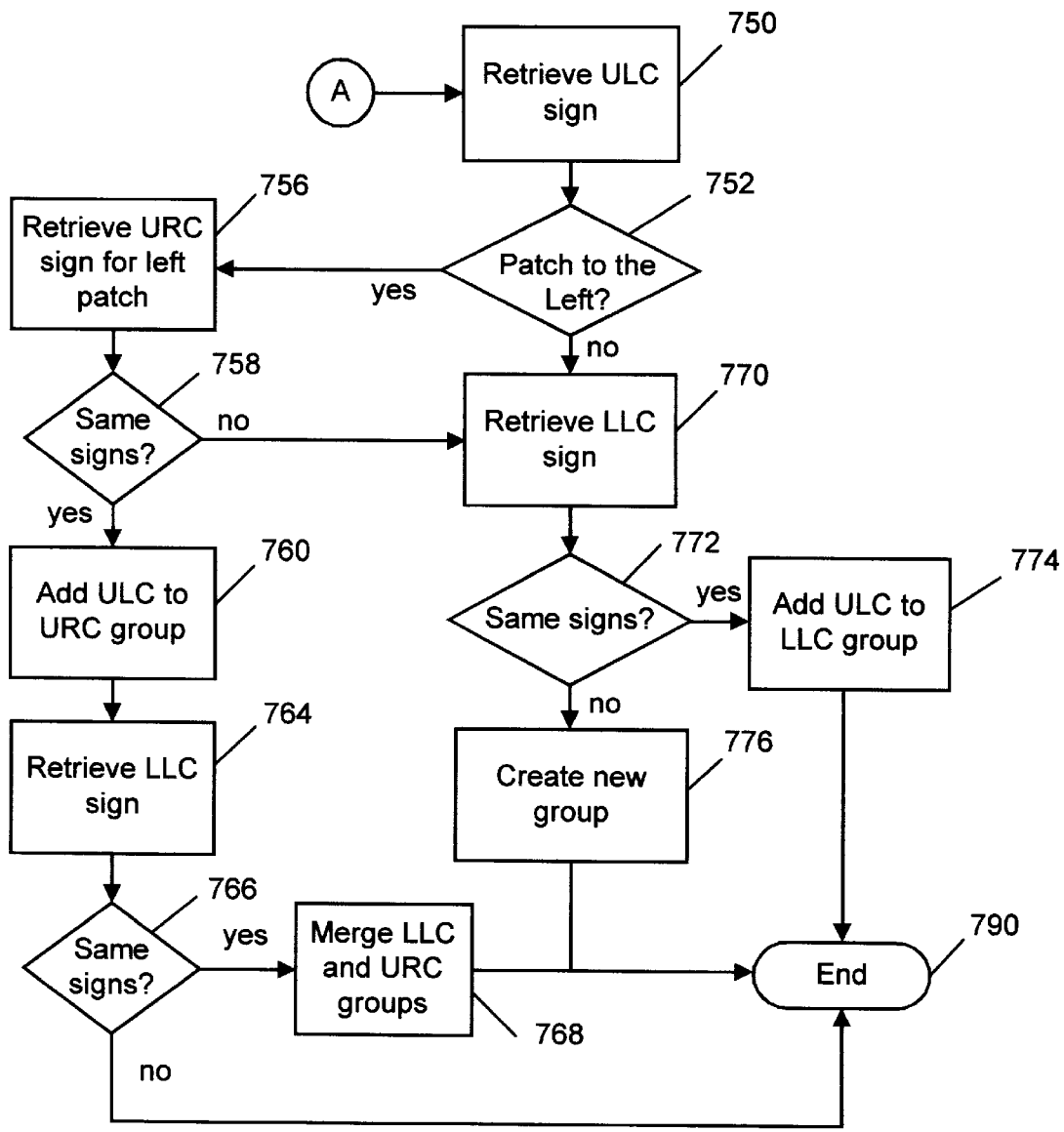

As shown in FIGS. 7a and 7b, left edge process 604 includes retrieving the sign of the lower left most corner (LLC) of the patch (700). A check is made to determine if a patch has been defined to the left of the patch being processed (702). If a patch does not exist to the left, this is the first patch in a row, and a check is made to determine if a patch exists below the patch currently being processed (704). If no patch exists below, then a new group is created which includes the LLC of the current patch (705) and the process continues at step 750 (FIG. 7b).

If a patch exists to the left as determined at step 702, then the sign of the lower right corner (LRC) of the left patch is retrieved (706). If the sign of the LRC of the left patch is the same as the LLC of the current patch (708), the LLC of the patch is added to the group of corners associated with the LRC of the left patch (710). Thereafter, a check is made to determine if a patch exists beneath the current patch (712). If no patch exists below the current patch, then the process continues at step 750. If a patch exists below the current patch, then the sign of the upper left corner (ULC) of the patch below the current patch is retrieved (714). A check is made to determine if the sign of the LLC of the current patch is the same as the sign of the ULC of the patch below (716). If the signs are different, then the process continues at step 750. If the signs are the same (for the LLC of the current patch and the URC of the patch below), then the groups associated with the LRC of the patch to the left and the ULC of the patch below are merged (718).

If no patch exists to the left of the current patch but a patch exists below as determined in step 704, then the sign associated with the upper left corner (ULC) of the patch below the current patch is retrieved (720). Thereafter, a check is made to determine if the sign of the ULC of the patch below and LLC of the current patch are the same (722). If the signs are the same, then the LLC of the current patch is added to the group associated with the ULC of the patch below (724). If the signs are not the same, then a new group is created that includes the LLC of the current patch (726) and the process continues at step 750.

At step 750, the sign of the upper left most corner (ULC) of the current patch is retrieved (750). A check is made to determine if a patch has been defined to the left of the patch being processed (752).

If a patch exists to the left as determined at step 752, then the sign of the upper right corner (URC) of the left patch is retrieved (756). A check is made to determine if the sign of the URC of the left patch is the same as the ULC of the current patch (758). If the signs are the same, then the ULC of the patch is added to the group of corners associated with the URC of the left patch (760). Thereafter, the sign of the lower left corner (ULC) of the current patch is retrieved (764). A check is made to determine if the sign of the LLC of the current patch is the same as the sign of the ULC of the current patch (766). If the signs are different, then the process ends at step 790. If the signs are the same (for the LLC and ULC of the current patch), then the groups associated with the LLC of the current patch and the URC of the patch to the left are merged (768) and the process ends.

If a no patch exists to the left as determined in step 752, then the sign associated with the lower left corner (LLC) of the current patch is retrieved (770). Thereafter, a check is made to determine if the sign of the ULC and the LLC of the current patch are the same (772). If the signs are the same, then the ULC of the current patch is added to the group associated with the LLC of the current patch (774). If the signs are not the same, then a new group is created that includes the ULC of the current patch (776) and the process ends.

The process described above provides a comparison for each point in the left edge of a patch being processed with the sign of the corner points directly beneath and to the left of a given point. The process for evaluating the bottom edge includes determining the groupings associated with the lower right most corner in the patch and the upper right most corner in the patch. The process described in reference to FIGS. 7a and 7b may be simply modified to provide a similar comparison for the lower right and upper right corners of the patch. In each case, a comparison is made to the sign of the corner to the left and below each point in the patch. New groups may be created, corners added to existing groups and groups merged just as described above in reference to FIGS. 7a and 7b.

Figure 8:
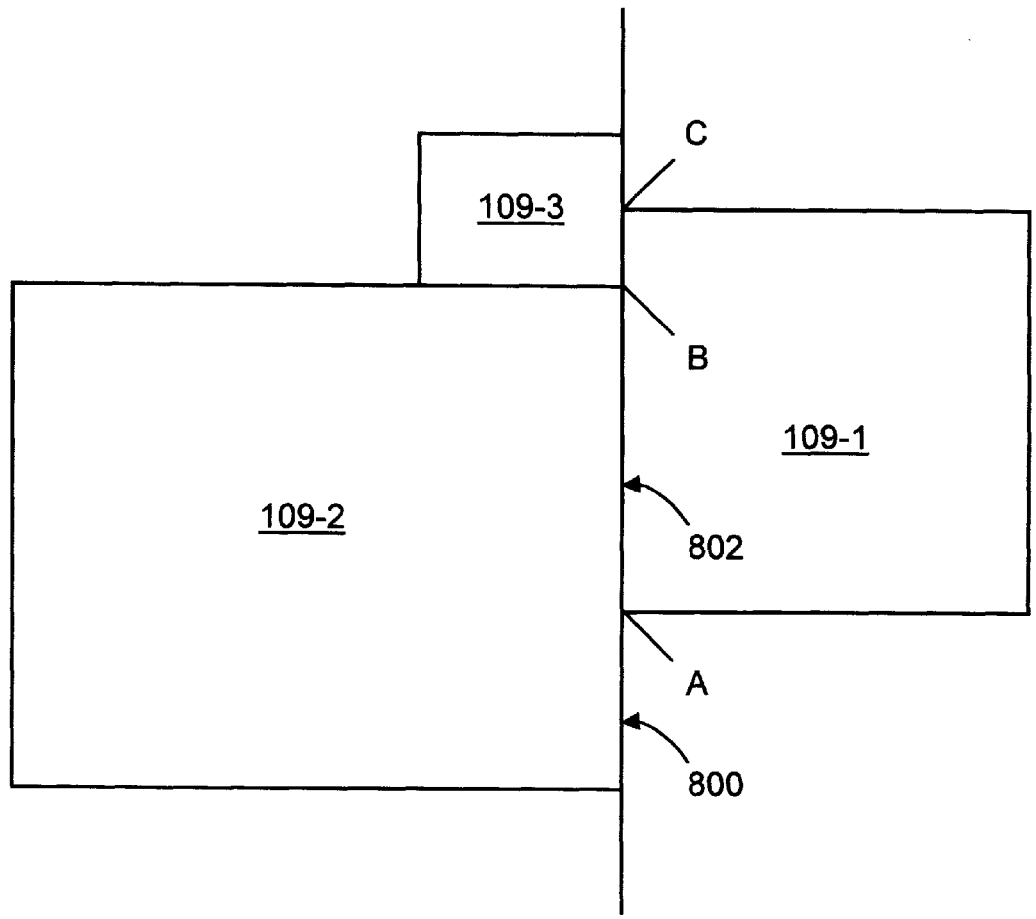
FIG. 8 is a schematic of a portion of a mesh according to the invention.

The process described above provides a comparison for corner points of adjacent patches and assumes that patches are aligned. However, when patches of a mesh have been subdivided, then the "grid" of patches that define the mesh may no longer be regular in that there may arise places where 3 patches meet at a corner of the grid and not four. Referring now to FIG. 8, a block diagram of a portion of a patch mesh shows this type of irregular condition where three patches 109-1, 109-2 and 109-3 meet at the point marked B.

Point A marks the bottom of the left edge 802 of patch 109-1 and point C the top. To the left of patch 109-1 at point A no patch corner is defined. The process described above is modified to include determining the sign at A point on edge 800 of patch 109-2 that is adjacent to the corner of patch 109-1 at point A. In one embodiment, this process is simplified by storing a pointer with each patch indicating whether or not a foldover is present. If no foldover is present, the sign of the point in patch 109-2 that corresponds to point A is the same as the sign at any corner of patch 109-2. If a foldover is present, then the sign is computed. The sign may be computed by creating a temporary patch that has a corner at the desired location. Alternativley, the sign may be computed directly by computing the partial derivatives of the function X(u,v) and the function Y(u,v) with respect to u and v and then determining the cross product [(dx/du)*(dy/dv)−(dx/dv)*(dy/du)] where the sign is positive (front facing) if the result is positive and negative (rear facing) if the result is negative.

The processing for the LLC for patch 109-1 is completed as described above. The processing for the left edge 802 of patch 109-1 is then continued with one other modification: rather than immediately advancing to the ULC of the patch, processing continues at the next point along the edge where a corner is located, in this case at point B. Processing at point B is performed in a similar fashion in that the sign for the point along edge 802 of patch 109-1 that corresponds to point B may have to be computed prior to making any comparisons to the respective corner points associated with patch 109-2 and 109-3. The process continues until the ULC of patch 109-1 is processed.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. The programmable computer may be part of a printer or display which receives patch mesh information and executes the methods disclosed herein to produce smoothly shaded regions on a visual or hard copy display connected to (or at) the output device.

Figure 9:
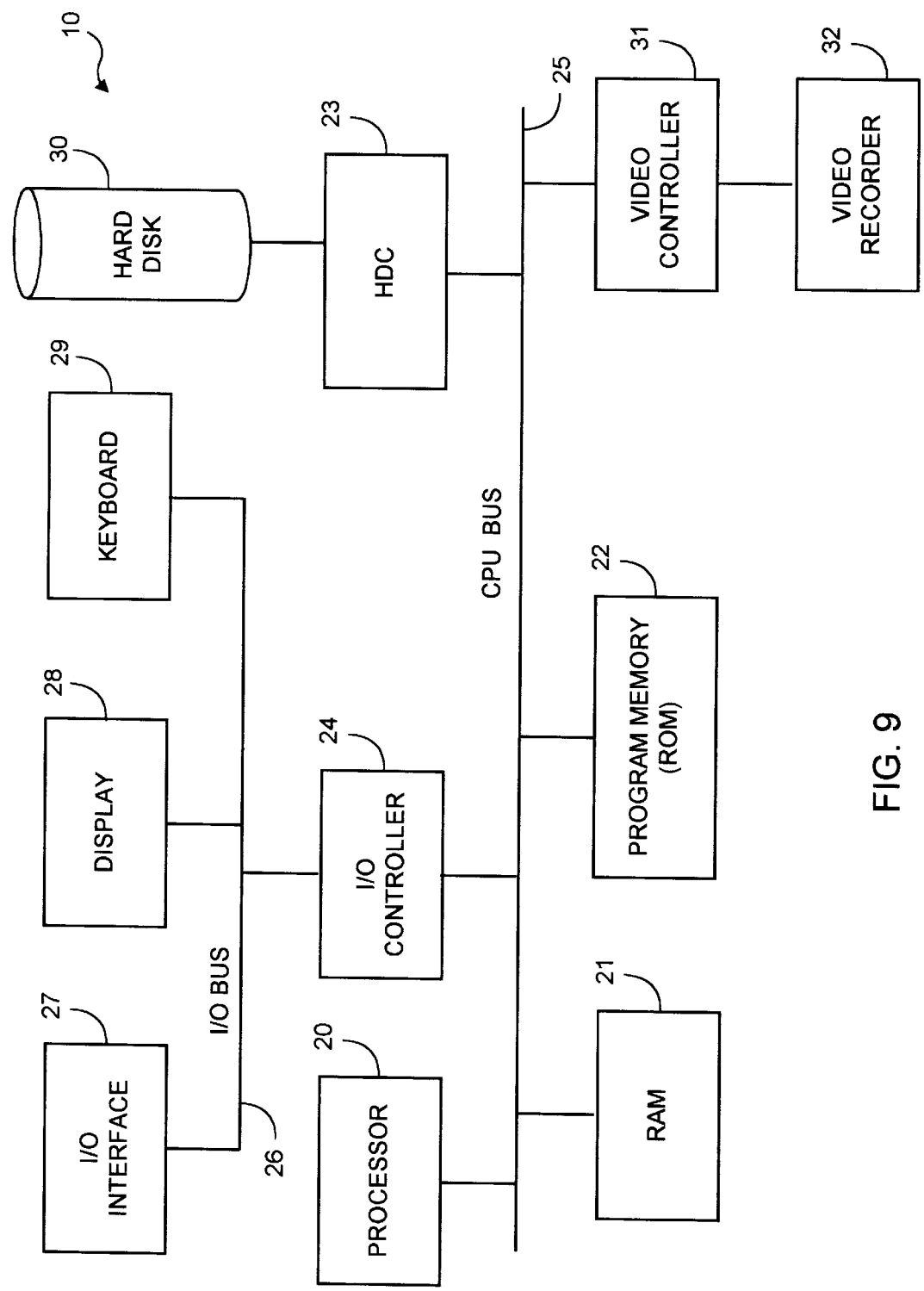
FIG. 9 is a schematic block diagram of a programmable information processing system according to the invention.

By way of example, FIG. 9 shows a block diagram of a programmable information processing system (computer) 10. Computer 10 preferably includes a processor 20, random access memory (RAM) 21, a program memory 22 (preferably a writable read-only memory (ROM) such as a flash ROM) and an input/output (I/O) controller 24 coupled by a CPU bus 25. Computer 10 may optionally include a hard drive controller 23 which is coupled to a hard disk 30 and CPU bus 25. Hard disk 30 may be used for storing application programs, including programs incorporating the present invention, and data. Programs may also be stored in RAM or ROM.

I/O controller 24 is coupled by means of an I/O bus 26 to an I/O interface 27. I/O interface 27 receives and transmits data in analog or digital form over communication links such as a serial link, local area network, wireless link, and parallel link. Optionally, a display 28, a keyboard 29 and a pointing device (such as a mouse) 31 may also be connected to I/O bus 26. Alternatively, separate connections (separate buses) may be used for I/O interface 27, display 28, keyboard 29 and pointing device 31. Computer 10 may be preprogrammed or it may be programmed (and reprogrammed) from another source (e.g., a floppy disk, CD-ROM, or another computer).

Each computer program is tangibly stored in a machine-readable storage medium or device (e.g., program memory 22 or magnetic disk) readable by a general or special purpose programmable computer, for configuring and controlling operation of a computer when the storage media or device is read by the computer to perform the processes described herein. The invention may also be considered to be embodied in a computer-readable storage medium, configured with a computer program, where the storage medium so configured causes a computer to operate in a specific and predefined manner to perform the functions described herein.

Below are five pseudo-code procedures that together implement the method for collecting patch corners into groups that will become the regions of a patch mesh. Names in the pseudo code that start with a lower case letter are variables. The variables refer to two kinds of data structures.

The first data structure is a Patch data structure. This represents the geometry of a given patch in the mesh, has information about what it is adjacent to in the mesh, and has a link field for forming a linked list of all patches.

The second data structure is a PatchCorner. This represents a corner and has information about what patch it belongs to, what other PatchCorners it is adjacent to, and a U and V coordinate giving its location in the mesh. With a mesh of patches, a U-V coordinate system is imposed such that each patch has a unique U-V coordinate at its lower left corner. The corners of the mesh are labeled in the usual Cartesian way, with (0,0) at the lower left corner. U increases by one with each grid step to the right. Likewise, V increases by one with each grid step up. Some of the patches may be subdivided before the region finding algorithm is used. In order to describe the resulting grid of patches and subdivided patches, a system of (U,V) coordinates that covers the entire mesh is defined. When a patch is subdivided, it is always cut in half, either on the U or V axis, or both. Thus, the coordinate values at the cut line are the average of the values on either side of the patch being split.

The following primitive operations are used in the pseudo code for Patches and PatchCorners:

| Name of operation | What it does |
|---|---|
| NextInList (p) | returns the patch after p in the list of all patches. |
| LLCorner (p) | returns the lower left PatchCorner of "p" |
| LRCorner (p) | returns the lower right PatchCorner of "p" |
| ULCorner (p) | returns the upper left PatchCorner of "p" |
| URCorner (p) | returns the upper right PatchCorner of "p" |
| Sign (p, pc) | returns the sign of Patch "p" at the location of PatchCorner "pc" |
| Group (p, sign) | The group representing those corners of Patch "p" with the given sign (+/−1) |
| GetULPatch (pc) | Returns patch to the upper left of PatchCorner "pc" |
| GetPatch (pc) | The patch that PatchCorner "pc" belongs to |
| UCoord (pc) | The U coordinate of PatchCorner "pc" |
| Vcoord (pc) | The V coordinate of PatchCorner "pc" |
| Group (pc) | The group that PatchCorner "pc" belongs to, or "NULL" if none. |

The signs of a Patch at the corners are precomputed. If the PatchCorner does not belong to the Patch, but instead belongs to a neighboring patch, and falls somewhere on the edge of the Patch, the sign is computed according to the following formulas. Let p be the Patch and pc the PatchCorner arguments to Sign:

$$s=(Ucoord(pc)-UCoord(LLCorner(patch)))/(UCoord(LRCorner(patch))-Ucoord(LLCorner(patch)))$$

$$t=(VCoord(pc)-VCoord(LLCorner(patch)))/(VCoord(ULCorner(patch))-Vcoord(LLCorner(patch)))$$

$$du=\text{Sum over } i=0,2 \text{ and } j=0,3 \text{ of } \{Binomial(2,i)*Binomial(3,j)*(P(i+1,j)-P(i,j))*(1-s)^i*s^{(2-i)}*(1-t)^j*t^{(3-j)}\}$$

$$dv=\text{Sum over } i=0,3 \text{ and } j=0,2 \text{ of } \{Binomial(3,i)*Binomial(2,j)*(P(i,j+1)-P(i,j))*(1-s)^i*s^{(3-i)}*(1-t)^j*t^{(2-j)}\}$$

$$cp=CrossProduct(du, dv)$$

$$Sign(pc)=Sign(cp)$$

The sign of the patch at the PatchCorner, pC, is the sign of the cross product, cp, computed above. The control points of the patch are the P(i,j) above. The quantities "du" and "dv" are vectors.

The code makes a simplifying assumption: since each patch has at most one fold, it is in at most two regions, a plus region and a minus region. A pointer to the group for each of these regions is stored with a patch, and either pointer may be null to indicate that the patch doesn't overlap a region of that sign. This simplifies things because it is no longer necessary to compare signs of corners in the same patch: they will automatically be in the same region if they have the same sign. The primitive operation Group (patchCorner) gets the patch the patchCorner belongs to and the sign of the patchCorner and calls the one argument version of the function of the same name.

```
Process 1: Processing all patches in a mesh to form groups of
patch corners, that will become regions. The patches are assumed
to be in a linked list, the first one in the list is the input.
    INPUT: firstPatch
    START:
        patch = firstPatch
        while (patch !=NULL) {
            ProcessLeftEdge (patch);/* see flow chart 2*/
            ProcessBottomEdge (patch) /* see flow chart 3 */
            sum = Sum of signs at corner of patch;
            if (Group (patch, +1) == Null and sum > −4
                Group (patch, +1) = new Group
            if (Group (patch, −1) == Null and sum < 4
                Group (patch, −1) = new Group
            Patch = NextInList (patch);
        }
    DONE.
Process 2: Processing the left edge of "patch"
    INPUT: patch
    START:
        r1=LLCorner (patch);
        patchL = GetULPatch (r1);
        if (patchL == NULL) return;
            /* Means there is no patch to the left */
        l1 = LRCorner (patchL);
        r1Sign = Sign (patch, r1);
        l1Sign = Sign (patchL, r1);
        if (l1Sign == r1Sign) {
            PropagateGroup (patchL, patch, l1Sign);
            /* See process 4*/
        }
        r2 = ULCorner (patch)
        prevCorner = r1
        loop {
            l2 = URCorner (patchL);
            if (Vcoord (r2) <= Vcoord (l2)) {
                r2Sign = Sign (patch, r2);
                l2Sign = Sign (patchL, r2);
                if (l2Sign == r2Sign) {
                    PropagateGroup (patchL, patch, l2Sign);
                } else {
                    if (l1Sign != r1Sign && r1Sign != r2Sign) {
                        midSign = FindEqualSign (
                            patchL, patch, prevCorner, r2);
                        /* see flow chart 5 */
                        PropagateGroup (patchL, patch, midSign);
                    }
                }
                exit loop
            } else {
                r2Sign = Sign(patch, r2);
                l2Sign = Sign (patchL, r2 );
                if (l2Sign == r2Sign)
                    PropagateGroup (patchL, patch, l2Sign);
                else {
                    if (l1Sign != r1Sign && r1Sign != r2Sign) {
                        midSign = FindEqualSign(
                            patchL, patch, prevCorner, l2 );
                        PropagateGroup (patchL, patch, midSign);
                    }
                }
                exit loop;
            } else {
                r2Sign = Sign(patch, l2);
                l2Sign = Sign (patchL, l2 );
                if (l2Sign == r2Sign)
                    propagateGroup(patchL, patch, l2Sign);
                else {
                    if (l1Sign !=r1Sign && r1Sign !=r2Sign) {
                        midSign = FindEqualSign(
                            patchL, patch, prevCorner, l2);
                        PropagateGroup (patchL, patch, midSign);
                    ]
                }
            /* Update for next time through loop: */
            l1 = l2;
            l1Sign = Sign (patchL, l1 );
            r1Sign = r2sign;
            if (l1Sign == r1Sign) {
```

-continued

```
            patchVtx->PropagateGroup(ll, llSign);
        }
        prevCorner = 12;
    }
}
DONE.
Process 3: Processing the bottom edge of "patch"
    START
    (Same as process 2 except processing proceeds to the right
instead of up)
    DONE
Process 4: Propagates a group with the given sign from one patch
1 to patch 2.
    INPUT: patch1, patchy, sign.
    START:
    if (Group(patch2, sign) == NULL) {
        Group(patch2, sign) = Group(patch1' sign);
    else {
        if (Group(patch2, sign) != Group(patch1, sign))
            MergeGroups(
                Group(patch2, sign),
                Group(patch2 sign));
    }
    DONE.
Process 5: Find a point on the edge shared by two patches where
the sign of the patches on either side is the same. This is only
called when the sign along the edge of one patch changes in the
opposite direction from that of the other patch. The inputs are
the two Patches and two PatchCorners between which to search.
Note that this pseudo code uses a version of the "Sign" operation
that takes the coordinates at which to compute the sign, as
opposed to a PatchCorner.
    INPUT: patch1, patch2, lowPC, higherPC
    START:
    lowU = Ucoord(lowPC);
    lowV = Vcoord(lowPC);
    hiU - Ucoord(higherPC);
    hiV = Vcoord(higherPC);
    lowSign = Sign(patch1, lowU, lowV);
    loopLimit = 20;
    while (loopLimit > 0) {
        midU = (lowU + hiU)/2;
        midV = (lowV + hiV)/2;
        sign1 = Sign(patch1, midU, midV);
        sign2 = Sign(patch2, midU, midV0);
        if (sign1 == sign2) return sign1;
        if (sign1 == lowSign) {
            lowU = midU;
            lowV = midV;
        ) else (
            hiU = midU;
            hiV = midV;
        }
        loopLimit = loopLimit -1;
    }
    return 1;
    DONE.
```

The present invention has been described in terms of specific embodiments, which are illustrative of the invention and not to be construed as limiting. Other embodiments are within the scope of the following claims.

What is claimed is:

1. A method for rendering a two dimensional (2D) patch associated with an object to achieve a smooth shading across the object, the 2D patch defining a complex gradient including at least one foldover edge, the method comprising:

subdividing the patch until each subpatch includes no more than one foldover edge;

grouping the subpatches into regions divided by a foldover edge;

defining a ordering for displaying the regions; and rendering the regions in order.

2. The method of claim 1 wherein the step of subdividing the patch includes:

determining a number of regions in the patch; and subdividing the patch if the patch is determined to include more than two regions.

3. The method of claim 2 wherein if the step of determining the number of regions in the patch determines that two regions are present where the two regions are separated by a foldover edge, then determining if the foldover edge bisects at least two distinct edges of the patch and if not, then further subdividing the patch.

4. The method of claim 2 wherein a region is characterized as being bounded on at least one side by a foldover edge and the process of determining the number of regions includes:

constructing a grid of control points associated with a patch, the grid including a plurality of cells;

computing a sign for each corner of the cells;

constructing a corner sign array from the signs computed in the computing sign step;

grouping the cells into regions; and counting a number of regions.

5. The method of claim 1 wherein the step of grouping patches into regions includes grouping patches that are adjacent and face a same direction.

6. The method of claim 5 further including the step of determining the direction a patch faces based on the direction each corner of the patch faces.

7. The method of claim 5 further including the step of determining if a patch or subpatch includes a foldover edge defining two distinct regions and if so then assigning an associated portion of the patch to each of the two distinct regions.

8. The method of claim 1 wherein the step of defining a ordering includes creating an ordered list of regions.

9. The method of claim 8 including storing the list as a trie in which adjacent regions are stored in a parent-child relationship in the trie.

10. The method of claim 9 in which the regions are rendered in display order by traversing the trie.

11. The method of claim 1 wherein the step of rendering the regions includes rendering each patch associated with a given region by dividing the patch into polygons, rendering the polygons and displaying the object.

12. The method of claim 11 where the step of rendering includes rendering only those portions of a patch that belong to a particular region.

13. The method of claim 1 wherein the step of grouping includes processing a left edge of the patch including evaluating corner points on the left edge to determine if corners associated with the left edge of the patch are to be included in a region associated with a patch immediately to the left or immediately below the patch;

processing a right edge of the patch including evaluating corner points on the right edge to determine if the corner points associated with the right edge are to be included in the same region associated with the left edge corner points or a region associated with a patch immediately below the patch.

14. A method of defining a complex gradient for application to an object to be displayed on an output device, the method comprising:

creating a mesh defining a gradient across the object;

manipulating the mesh to obtain a graphically pleasing shading including foldover edges;

rendering the mesh including subdividing the mesh into subpatches including not more than one foldover edge, grouping the subpatches into regions, ordering the regions and displaying the regions according to the display order.

15. A method for rendering a two dimensional (2D) mesh associated with an object to achieve a smooth shading across the object, the 2D mesh including a plurality of patches defining a complex gradient including at least one foldover edge, the method comprising:

creating a list of patches;

sorting the list to achieve a predefined ordering of patches;

processing the patches in the list in order including subdividing the patches until each patch or subpatch includes no more than one foldover edge;

grouping the patches and subpatches into regions divided by a foldover edge;

defining an ordering for displaying the regions; and rendering the regions in display order.

16. The method of claim 15 wherein the step of subdividing the patch includes:

determining a number of regions in the patch; and subdividing the patch if the patch is determined to include more than two regions.

17. The method of claim 16 wherein if the step of determining the number of regions in the patch determines that two regions are present where the two regions are separated by a foldover edge, then determining if the foldover edge bisects at least two distinct edges of the patch and if not, then further subdividing the patch.

18. The method of claim 17 wherein a region is characterized as being bounded on at least one side by a foldover edge and the process of determining the number of regions includes:

constructing a grid of control points associated with a patch, the grid including a plurality of cells;

computing a sign for each corner of the cells;

constructing a corner sign array from the signs computed in the computing sign step;

grouping the cells into regions; and counting a number of regions.

19. The method of claim 15 wherein the step of grouping patches into regions includes grouping patches that are adjacent and face a same direction.

20. The method of claim 19 further including the step of determining the direction a patch faces based on the direction each corner of the patch faces.

21. The method of claim 19 further including the step of determining if a patch or subpatch includes a foldover edge defining two distinct regions and if so then assigning an associated portion of the patch or subpatch to each of the two distinct regions.

22. The method of claim 15 wherein the step of defining a ordering includes creating an ordered list of regions.

23. The method of claim 22 including storing the list as a trie in which adjacent regions are stored in a parent-child relationship in the trie.

24. The method of claim 23 in which the regions are rendered in display order by traversing the trie.

25. The method of claim 15 wherein the step of rendering the regions includes rendering each patch associated with a given region by dividing the patch into polygons, rendering the polygons and displaying the object.

26. The method of claim 25 where the step of rendering includes rendering only those portions of a patch that belong to a particular region.

27. The method of claim 15 wherein the step of grouping includes processing a left edge of the patch including evaluating corner points on the left edge to determine if corners associated with the left edge of the patch are to be included in a region associated with a patch immediately to the left or immediately below the patch;

processing a right edge of the patch including evaluating corner points on the right edge to determine if the corner points associated with the right edge are to be included in the same region associated with the left edge corner points or a region associated with a patch immediately below the patch.

28. The method of claim 15 wherein the step of subdividing includes processing each subpatch produced as a result of a subdivision prior to retrieving and processing a next patch from the list.

29. A computer program, tangibly stored on a computer-readable medium, for rendering a two dimensional (2D) patch associated with an object to achieve a smooth shading across the object where the 2D patch defines a complex gradient including at least one foldover edge, the computer program comprising instructions for causing a computer to:

subdivide the patch until each subpatch includes no more than one foldover edge;

group the subpatches into regions divided by a foldover edge;

define a ordering for displaying the regions; and render the regions in order.

30. A computer program, tangibly stored on a computer-readable medium, for rendering a two dimensional (2D) mesh associated with an object to achieve a smooth shading across the object where the 2D mesh includes a plurality of patches 2D defining a complex gradient including at least one foldover edge, the computer program comprising instructions for causing a computer to:

create a list of patches;

sort the list to achieve a predefined ordering of patches;

process the patches in the list in order including subdividing the patches until each patch or subpatch includes no more than one foldover edge;

group the patches and subpatches into regions divided by a foldover edge;

define an ordering for displaying the regions; and render the regions in display order.

31. An apparatus for rendering a two dimensional (2D) mesh associated with an object to achieve a smooth shading across the object where the 2D mesh includes a plurality of patches 2D defining a complex gradient including at least one foldover edge, the apparatus comprising:

means for creating a list of patches;

means for sorting the list to achieve a predefined ordering of patches;

means for processing the patches in the list in order including means for subdividing the patches until each patch or subpatch includes no more than one foldover edge;

means for grouping the patches and subpatches into regions divided by a foldover edge;

means for defining an ordering for displaying the regions; and means for rendering the regions in display order.

* * * * *